2,842,606
RUBBER LATEX COMPOSITIONS HEAT-SENSITIZED WITH POLYMETHOXY ACETALS

George G. Stoner, Easton, Pa., Julian L. Azorlosa, Westbury, N. Y., and Charles P. Albus, Easton, Pa., assignors to General Aniline & Film Corporation, New York, N. Y., a corporation of Delaware No Drawing. Application December 30, 1954
Serial No. 478,866

5 Claims. (Cl. 260—815)

This invention relates to natural rubber latex compositions which are heat-sensitized with polymethoxy acetals.

In the rubber art, articles such as gloves, fountain pen sacks, bathing caps, meteorological balloons, sponge rubber, etc., have generally been produced by either a (1) straight dip, (2) coagulating dip, (3) gel-dipping, (4) molding, or (5) heat-sensitized latex process.

In the heat-sensitized process, a rubber latex is rendered heat-sensitive by the addition of inorganic or organic compounds. An impermeable hot form or mold is taken dipped into the latex, held for a period of time to obtain a coagulate of the desired thickness, withdrawn from the latex, dried, washed in water to remove the water-soluble materials, dried, and cured. The heat-sensitized latices may be poured into molds which are subsequently heated to coagulate the latex. They may also be used for impregnating porous materials, such as paper, cloth, etc., squeezed to remove excess latex, and then coagulated by heat which also dries the impregnated article.

Many inorganic materials such as soluble bivalent and trivalent metal salts, mixture of zinc oxide and an ammonium salt of a strong acid, ammonium persulfate, sodium silicofluoride, and organic materials such as trimethyl cellulose, proteins of animal or vegetable origin and their degradation products e. g. egg albumen, organic colloids such as gelatin; organic colloids such as celluloses, hemicelluloses, polysaccharides, viscose, etc., disubstituted guanidine, nitroparaffins of 1 to 6 carbon atoms have been proposed as heat-sensitizers for rubber latex.

The foregoing heat-sensitizers have not come into common use because of one or more defects. Latices containing additions of inorganic salts such as ammonium nitrate, calcium chloride, etc. tend to coagulate prematurely and to corrode storage drums and dipping pots. Proteins, gelatin, polysaccharides, and similar materials are subject to bacterial attack, and generally seem to do little more than concentrate or cream latex when used as heat-sensitizers. Nitroparaffins are ineffective alone and are used in conjunction with zinc oxide or oxides and hydroxides of elements of periods 2–6 of group II of the periodic table. In addition, these materials appear to be rather slow in their action as heat-sensitizers.

It is an object of this invention to provide heat-sensitized natural rubber latex compositions which are stable on storage and non-corrosive to storage drums and dipping pots.

Another object is to provide heat-sensitized natural rubber latex compositions which will readily coagulate around a form heated to temperatures of 30 to 130° C. within an extremely short period of time.

A further object is to provide a heat-sensitized natural rubber latex composition which will yield relatively thick coagulates when contacted with a suitable hot form, either by immersion of the form in the latex for a very short period or by adding the composition to a hollow form or mold which is subsequently heated.

Other objects and advantages will become more clearly apparent from the following description.

We have found that the foregoing objections with regard to heat-sensitizers are readily overcome by the employment of polymethoxy acetals, or mixtures thereof, having the following general formula:

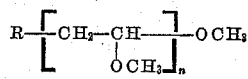

where $n$ is an integer having a value ranging from 5 to 40, and R is hydrogen or lower alkyl, such as methyl, ethyl, propyl, butyl, etc.

The polymethoxy acetals characterized by the foregoing general formula are readily prepared in the conventional manner by the condensation of methyl vinyl ether and methyl alcohol or acetal (1,1-dimethoxyalkanes) in the presence of boron fluoride as a catalyst. The preparation of these compounds is fully described in U. S. P. 2,165,962 and 2,487,525.

It is to be noted, however, that in the above general formula wherein R is hydrogen, $n$ represents the number of moles of methyl vinyl ether used per mole of methyl alcohol. For the purpose of the present invention, we prefer to employ products in which $n$ has the value of 5 to 40, and mixtures thereof. In this connection, it is to be noted that "$n$" also represents the average degree of polymerization in the foregoing general formula of the resulting polymethoxy acetal. In other words, "$n$" indicates how many repeating units there are in the unfractionated product on the average. The product, i. e. polymethoxy acetals characterized by the foregoing structural formula, are mixtures which can, for the sake of clear explanation, be called $n:1$ polymethoxy acetals, which, when abbreviated are referred to herein as PMAC–$n$, or $n:1$ methoxy acetals. When $n$ is 11, 11 moles of methyl vinyl ether and one mole of methyl alcohol are involved in the condensation reaction. The resulting product, therefore, can be identified as 11:1 polymethoxy acetals, PMAC–11, or 11:1 methoxy acetals.

Individual members of the PMAC series as disclosed in U. S. P. 2,165,962 are as follows: 1,1-dimethoxyethane; 1,1,3-trimethoxybutane; 1,1,3,5-tetramethoxyhexane; 1,1,3,5,7-pentamethoxyoctane; 1,1,3,5,7,9-hexamethoxydecane; 1,1,3,5,7,9,11-heptamethoxydodecane; 1,1,3,5,7,9,11,13-octamethoxytetradecane; and in general, 1,1, 3,5 . . . (2$n$−1) - polymethoxyalkanes. The number of polymethoxy groups is $n+1$ on the average for PMAC–$n$. The number of carbon atoms in the parent alkane is 2$n$. For instance, in 5:1 methoxy acetals, also called PMAC–5, a principal individual homolog has the structure—

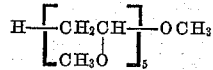

and the name of this important individual member is 1,1,3,5,7,9-hexamethoxydecane. Unfractionated PMAC–5 also contains—

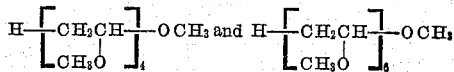

and lesser amounts of—

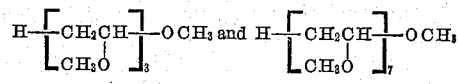

as well as 1,1,3-trimethoxybutane, 1,1-dimethoxyethane (unless distilled off), and higher homologs.

In carrying out the invention, about 0.5 to 3% of a conventional stabilizing agent is generally first added to natural rubber latex to prevent coagulation of the latex on the addition of acid. The pH of the latex is then lowered to a value of 7.5 or other value as desired by the addition of any one of the various inorganic or organic acids. The filler, vulcanizing agents, color, and other compounding ingredients are then added as a dispersion, and lastly, 2 to 10%, and preferably 4 to 6%, of polymethoxy acetals are added. The latex is stirred or agitated by some suitable means as each addition is made to ensure complete solution or blending of each ingredient. After the polymethoxy acetals are added stirring is continued for a few minutes.

The latex is now heat-sensitized and may be immediately used or allowed to stand for 12 to 24 hours. In some instances, it has been found that a slight "ripening" action, as noted by a slight or moderate decrease in the coagulation point of the heat-sensitized latex, may occur when the latex is allowed to stand for a period of 12 to 24 hours. In either instance, it is advantageous to determine the coagulation point of the heat-sensitized latex after preparation and after storage for 12 to 24 hours. This will not only give the minimum temperature to which a form must be heated before it is inserted into the latex to obtain a coagulate but also indicate storage temperatures which will cause premature coagulation of the compounded latex. For example, we have found that natural rubber latices heat-sensitized by the addition of polymethoxy acetals should be stored at temperatures at least 10 to 15° C. below the coagulation point of the latex to prevent premature coagulation. However, for best results, storage temperatures of 20 to 25° C. are preferred.

The coagulation point is easily determined as follows:
10 to 15 ml. of the heat-sensitized latex is poured into a 20 x 150 mm. Pyrex test tube and a thermometer inserted. A 400 ml. dye beaker is half to three-fourths filled with cold water and placed on a hot plate. The test tube containing the latex and thermometer is then inserted into the water contained in the beaker and the hot plate turned on. The temperature of the latex is allowed to rise 2 to 5° C. per minute. At the same time, the latex is intermittently stirred with the thermometer to prevent too great a temperature lag. The coagulation point is taken as the temperature at which all of the heat-sensitized latex coagulates into a solid mass of rubber. Coagulation of the latex into a solid mass of rubber appears to occur almost instantaneously at a given temperature and does not occur over a wide temperature range.

The natural rubber latex used may consist of purified, creamed, centrifuged, filtered, evaporated, or crude (plantation) latex. However, it is to be understood that we are not limited to the use of natural rubber latex. Synthetic rubber latices such as emulsions of polymerization products of 1,3-butadiene or mixtures of 1,3-butadiene with other polymerizable olefins or diolefins, alpha-methylene carboxylic acids and their esters, nitriles, amides, etc., and including polymerized 2-chloro-1,3-butadiene or like materials which when properly compounded and on the addition of polymethoxy acetal show a similar tendency to become heat-sensitive are also included.

The stabilizer is added in an amount sufficient to prevent coagulation of the latex when the pH is lowered to a value of about 7.5 or some higher desired value. For centrifuged natural rubber latex, we have found that generally additions of stabilizer ranging from about 0.5 to about 3%, and preferably from 0.5 to 1.5%, based on the total solids of the latex, is sufficient to stabilize the latex to additions of various strong acids, such as 1 N sulfuric, acetic, etc. acids. As the amount of stabilizer added is progressively increased over the minimum amount necessary to stabilize the latex to additions of acid, the coagulation point and stability of the heat-sensitized latex will also increase until a point is reached when the latex is over-stabilized and no longer able to coagulate around a hot mold or form dipped into the latex. For this reason, there is little or no advantage to be gained by adding any more stabilizer than the minimum amount necessary to stabilize the latex to additions of acid and help impart the necessary storage stability. Rubber latex stabilizers are numerous and have been described in the patent literature. For the purpose of the present invention, we prefer for the sake of expediency to employ those stabilizing agents disclosed in the third and fourth columns of U. S. P. 2,446,115 including the reaction product of ethylene oxide and oleyl alcohol in the mole ratio of 20:1. Alkylphenoxypoly - oxyethylene - ethanols, condensation products of an alkylnaphthol with 8 moles of ethylene oxide as described in U. S. P. 1,970,578 and 2,213,477, all of which are commercially available under various brand and trade names. All of these stabilizers are effective in preventing coagulation of natural rubber latex upon the addition of strong acids.

Various inorganic and organic acids may be used for lowering the pH of natural rubber latex.

Examples of such acids are hydrochloric, nitric, phosphoric, sulfuric, acetic, formic, oxalic, tartaric and glycolic acid, etc. In addition various acid salts which are used in the art for lowering the pH of rubber latices may also be used. It is to be noted that as less acid is used the coagulation point and stability of the latex increases. For some applications this may be highly desirable. However, for the purpose of the present invention, especially when employing the polymethoxy acetals, the pH may be lowered from its original value to 9.0, 8.0, 7.5, or any intermediate value by the addition of either sulfuric acid, or any of the above-mentioned acids or acid salts. However, if the pH value of the latex is too high after the acid is added, no heat-sensitization will occur when the polymethoxy acetals are added.

The vulcanizing dispersion may be any one of the type commonly used in the art for natural rubber latex and contain filler, vulcanizer, accelerator, anti-oxidant, plasticizer, color, and other compounding ingredients. The only limitation is that such auxiliary materials do not cause coagulation of the latex when they are added. A typical vulcanizing dispersion which has been found satisfactory consists of:

| | Parts |
|---|---|
| Kaolin | 200 |
| Zinc oxide | 100 |
| Sulfur | 60 |
| Mercaptobenzothiazole | 20 |
| Sodium salt of a sulfonated naphthalene-formaldehyde condensate | 20 |
| Water | 600 |

All the parts given are by weight.

Another example of a satisfactory vulcanizing dispersion suitable for natural rubber latex consists of:

| | Parts |
|---|---|
| Zinc oxide | 450 |
| Sulfur | 90 |
| Zinc dimethyldithiocarbamate | 45 |
| Sodium salt of a sulfonated naphthalene-formaldehyde condensate | 45 |
| Distilled water | 945 |

The amount of polymethoxy acetals, either as the individual homolog or mixtures thereof, are lastly added to natural rubber latex, compounded as previously given, generally in a concentration of 2 to 10%, but preferably 4 to 6%, to heat-sensitize the latex. Amounts lower than 2% will either fail to heat-sensitize the latex or else give unsatisfactory coagulates. Excessive additions of the polymethoxy acetals serve no particularly useful purpose.

The following examples are given to illustrate the new and unexpected properties of the heat-sensitizers of the present invention and the efficacy with which they cause natural rubber latex to deposit or coagulate rather thick films of rubber onto a hot form immersed in the latex.

EXAMPLE 1

The following composition was prepared:

| | Wet Basis | Dry Basis |
|---|---|---|
| Centrifuged Natural Rubber Latex (62.56% total solids) | 80 | 50 |
| 10% Polyoxyethylated Oleyl Alcohol [1] | 7 | 0.7 |
| pH | 10.20 | 10.20 |
| 0.973 N Sulfuric Acid (ml.) | 31.7 | 1.51 |
| pH | 7.50 | 7.50 |
| Vulcanizer Dispersion (40% total solids) | 25 | 10 |
| pH | 7.59 | 7.59 |
| 15:1 Polymethoxy Acetals | 2.5 | 2.5 |
| pH | 7.62 | 7.62 |
| Coagulation Point, °C.: | | |
| After Preparation | 44 | 44 |
| After 24 Hr. at Room Temperature | 38 | 38 |

[1] The reaction product of ethylene oxide and oleyl alcohol in the mole ratio of 20:1.

The centrifuged natural rubber latex was weighed into a tared 400-ml. glass beaker following which 7 grams of the 10% solution of polyoxyethylated oleyl alcohol was added. The latex was then placed on a ring stand, and a glass paddle-type stirrer attached to a variable-speed motor was inserted into the latex. Stirring was then begun. The electrode leads of a Beckman pH meter were inserted into the latex and the meter turned on. Sulfuric acid (0.973 N) was added dropwise from a burette to a pH of 7.5. The vulcanizer dispersion was then added by difference from a 30-ml. beaker following which the polymethoxy acetals were also added by difference from a 30-ml. beaker. The pH of the latex was determined after each addition. The latex composition was stirred for several minutes after the polymethoxy acetals were added and then poured into an 8-oz. bottle, capped and labeled. The coagulation point was determined after preparation and after standing at room temperature for 24 hours.

After preparation, the coagulation point of the heat-sensitized latex was 44° C. On "ripening" for 24 hours at room temperature, the coagulation point fell to 38° C. A control composition prepared in exactly the same way but containing no 15:1 polymethoxy acetals had a coagulation point after preparation of 79° C. which remained unchanged on standing for 24 hours at room temperature.

EXAMPLE II

Several control compositions of the latex were prepared to which no polymethoxy acetals were added in order to determine the temperatures needed to coagulate the latex without the presence of the heat-sensitizer. The results obtained from five separate experiments are shown in Table 1. All parts are in grams unless otherwise noted.

Table 1

| Composition | 1 | 2 | 3 | 4 | 5 |
|---|---|---|---|---|---|
| Centrifuged Natural Rubber Latex (62.56% total solids) | 80 | 80 | 80 | 80 | 80 |
| 10% Polyoxyethylated Oleyl Alcohol | 4 | 5 | 6 | 7 | 8 |
| pH | 10.25 | 10.25 | 10.25 | 10.23 | 10.25 |
| 0.973 N Sulfuric Acid, ml | 31.4 | 31.2 | 31.2 | 31.4 | 30.8 |
| pH | 7.50 | 7.50 | 7.51 | 7.50 | 7.50 |
| Vulcanizer Dispersion (40% total solids) | 25 | 25 | 25 | 25 | 25 |
| pH | 7.55 | 7.55 | 7.57 | 7.55 | 7.55 |
| Coagulation Point, °C.: | | | | | |
| After Preparation | 76 | 79 | 80 | 79 | 76 |
| After 24 hr. at R. T. | 74 | 78 | 80 | 79 | 75 |

Appearance of Latex: After Preparation:
 1–5. Good; fluid; smooth, no coagulation at all.
After 24 hr. at R. T.:
 1. Some coagulated latex on top; balance fluid, smooth, and foamy.
 2–5. Good; fluid; smooth.

It is to be noted that in every case, the control compositions had rather high coagulation points which indicates that these compositions would not be very satisfactory for preparing films.

In order to determine (1) the ease with which the compostions of Table 1 would deposit a film on a hot form, (2) the thickness of the deposit when the hot form was held in the latex for a period of 30 seconds and then withdrawn, and (3) the appearance of the coagulate obtained, a number of dipping tests were carried out. In these tests, a 20 x 150 mm. Pyrex test tube was half-filled with glycerol and a thermometer inserted. The test tube and its contents were then heated to a temperature of 125° C., dipped into the latex, held for a period of 30 seconds, and then withdrawn. The bottom temperature on withdrawing the test tube from the latex was 95° C. The results of the tests for compositions 1 to 5 of Table 1 which had been allowed to stand for 24 hours at room temperature before the tests were carried out were as follows:

Appearance of coagulates:
1. Weak, thin, uneven coagulate about 1/16 to 1/32 inch thick. Seems to be no more than a thin skin on the test tube which was drippy and weak.
2. Very thin, weak, drippy, uneven coagulate about 1/64 inch or less thick. Seems to be no more than a skin of coagulate produced by local heating.
3–5. Weak, drippy, uneven coagulate about 1/64 inch or less thick.

It is to be noted that the control compositions generally gave thin, weak, uneven coagulates which appeared to consist of little more than a thin skin produced by local heating. This resulted in spite of the fact that the test tube and its contents were heated to a temperature of 125° C. which was generally much higher than similar compostions containing the polymethoxy acetals given in the examples which follow. Thus even under the most advantageous conditions these control compositions failed to deposit anything but thin, weak, uneven films on a hot form.

EXAMPLE III

The compositions listed in Table 2 containing an addition of 5% of 5:1 polymethoxy acetals were then prepared. All parts given are in grams unless otherwise noted.

Table 2

EVALUATION OF 5:1 METHOXY ACETALS AS A HEAT SENSITIZER FOR NATURAL RUBBER LATEX

| Composition | 1 | 2 | 3 | 4 | 5 |
|---|---|---|---|---|---|
| Centrifuged Natural Rubber Latex (62.56% total solids) | 80 | 80 | 80 | 80 | 80 |
| 10% Polyoxyethylated Oleyl Alcohol | 4 | 5 | 6 | 7 | 8 |
| pH | 10.23 | 10.23 | 10.23 | 10.25 | 10.25 |
| 0.973 N Sulfuric Acid, ml | 32.3 | 33.0 | 32.9 | 32.3 | 31.5 |
| pH | 7.52 | 7.50 | 7.50 | 7.50 | 7.52 |
| Vulcanizer Dispersion (40% total solids) | 25 | 25 | 25 | 25 | 25 |
| pH | 7.61 | 7.55 | 7.58 | 7.58 | 7.62 |
| 5:1 Polymethoxy Acetals | 2.5 | 2.5 | 2.5 | 2.5 | 2.5 |
| pH | 7.65 | 7.68 | 7.62 | 7.65 | 7.68 |
| Coagulation Point, °C.: | | | | | |
| After Preparation | 67 | 69 | 70 | 70 | 67 |
| After 24 hr. at R. T. | 70 | 69 | 70 | 69 | 67 |

Appearance of Latex: After Preparation:
 1–5. Good; fluid; smooth; no coagulation.
After 24 hr. at R. T.:
 1–5. Good; fluid; smooth.

From the foregoing table it will be noted that the coagulation point of these compositions is consistently lower than similar control compositions of Table 1. As a result, they are somewhat more satisfactory as heat-sensitized latices.

As in Example II, a 20 x 150 mm. Pyrex tube was half-filled with glycerol and a thermometer inserted. The test tube and its contents was heated to 125° C., dipped into the heat-sensitized latices, held for 30 seconds, and withdrawn. The bottom temperature on withdrawing the test tube from the latex was 95° C. The coagulate adhering to the form was then observed for its thickness and appearance. The results obtained with compositions 1 to 5 of Table 2 which had been allowed to stand for 24 hours at room temperature were as follows:

Appearance of coagulates:
1–5. A 1/16-inch thick coagulate was obtained.

The latices heat-sensitized with 5:1 polymethoxy acetals gave somewhat thicker and more satisfactory coagulates than the control compositions of Table 1.

EXAMPLE IV

This example illustrates the new and unexpected heat-sensitizing effect which occurs when polymethoxy acetals are added to natural rubber latex compositions and is shown by 11:1 polymethoxy acetals. To show this effect the following compositions were prepared. All parts given are in grams unless otherwise noted.

Table 3

EVALUATION OF 11:1 METHOXY ACETALS AS A HEAT SENSITIZER FOR NATURAL RUBBER LATEX

| Composition | 1 | 2 | 3 | 4 | 5 |
|---|---|---|---|---|---|
| Centrifuged Natural Rubber Latex (62.56% total solids) | 80 | 80 | 80 | 80 | 80 |
| 10% Polyoxyethylated Oleyl Alcohol | 4 | 5 | 6 | 7 | 8 |
| pH | 10.23 | 10.25 | 10.25 | 10.23 | 10.21 |
| 0.973 N Sulfuric Acid | 32.2 | 31.9 | 31.5 | 31.2 | 30.7 |
| pH | 7.50 | 7.50 | 7.51 | 7.50 | 7.50 |
| Vulcanizer Dispersion (40% total solids) | 25 | 25 | 25 | 25 | 25 |
| pH | 7.60 | 7.60 | 7.60 | 7.60 | 7.60 |
| 11.1 Polymethoxy Acetals | 2.5 | 2.5 | 2.5 | 2.5 | 2.5 |
| pH | 7.65 | 7.66 | 7.65 | 7.66 | 7.65 |
| Coagulation Point, °C.: | | | | | |
| After Preparation | 35 | 39 | 41 | 43 | 45 |
| After 24 Hr. at R. T. | 34 | 39 | 40 | 43 | 43 |

Appearance of Latex: After Preparation:
1–5. Good; fluid, smooth.
After 24 hr. at R. T.:
1. Large lump of coagulated latex present; balance smooth and fluid.
2. Slight amount of coagulated latex present; balance of latex fluid and smooth.
3,4,5. Good, fluid, and smooth.

From the above table it will be noted that the coagulation points of compositions 1 to 5 are 30 to 40° C. lower than similar control compositions listed in Table 1 and that this effect is obtained solely by the addition of 5% of 11:1 polymethoxy acetals to the latex compositions. It becomes manifest that these compositions would show excellent deposition of rather thick films onto a hot form immersed in the latex.

To substantiate this point, a 20 x 150 mm. Pyrex test tube was half-filled with glycerol and a thermometer inserted. The test tube and its contents were then heated to a temperature of only 80° C., dipped into the latex, held for a period of 30 seconds, and withdrawn. Bottom temperature of the test tube with glycerol was 70° C. when removed from the latex. The coagulate adhering to the form was then observed for thickness and appearance. The results obtained were as follows for compositions 1 to 5 of Table 3:

Appearance of coagulates:
1–5. Excellent coagulate about 1/8-inch thick; smooth, even in thickness; no running or dripping of latex.

A much heavier and thicker film was deposited on a hot form heated to only 80° C. when natural rubber latex was heat-sensitized by the addition of 5% of 11:1 polymethoxy acetals than was obtained on a hot form heated to 125° C. for the similar control compositions of Table 1. It appears evident that films much thicker than 1/8-inch would have been obtained if the test tube had been heated to a temperature of 125° C. (as in the case of the control compositions of Table 1) and dipped into the 11:1 polymethoxy acetals heat-sensitized latex. The film obtained by dipping a hot form into the latex composition heat-sensitized with 11:1 polymethoxy acetals was also smooth, of even thickness, showed no dripping of latex off the coagulate, and much better in general appearance than coagulates obtained from the control compositions of Table 1.

EXAMPLE V

As a further illustration of the efficacy with which polymethoxy acetals function to heat-sensitized natural rubber latex compositions, the following compositions containing a 5% addition of 15:1 polymethoxy acetals, based on the total solids of the latex, were prepared (Table 4). All parts given are in grams unless otherwise noted.

Table 4

EVALUATION OF 15:1 METHOXY ACETALS AS A HEAT SENSITIZER FOR NATURAL RUBBER LATEX

| Composition | 1 | 2 | 3 | 4 | 5 |
|---|---|---|---|---|---|
| Centrifuged Natural Rubber Latex (62.56% total solids) | 80 | 80 | 80 | 80 | 80 |
| 10% Polyoxyethylated Oleyl Alcohol | 4 | 5 | 6 | 7 | 8 |
| pH | 10.20 | 10.20 | 10.20 | 10.20 | 10.17 |
| 0.973 N Sulfuric Acid | 31.9 | 31.8 | 31.1 | 31.7 | 30.7 |
| pH | 7.50 | 7.50 | 7.50 | 7.50 | 7.50 |
| Vulcanizer Dispersion (40% total solids) | 25 | 25 | 25 | 25 | 25 |
| pH | 7.60 | 7.60 | 7.58 | 7.59 | 7.58 |
| 15:1 Polymethoxy Acetals | 2.5 | 2.5 | 2.5 | 2.5 | 2.5 |
| pH | 7.63 | 7.62 | 7.62 | 7.62 | 7.62 |
| Coagulation Point, °C.: | | | | | |
| After Preparation | 34 | 35 | 42 | 44 | 47 |
| After 24 hr. at R. T. | 30 | 30 | 35 | 38 | 42 |

Appearance of Latex: After Preparation:
1–5. Good; fluid; smooth.
After 24 Hr. at R. T.:
1. Coagulated on shaking the latex at room temperature (30° C.).
2. Seemed to be partly coagulated or flocculated; balance good.
3. Fairly large piece of coagulated or flocculated rubber present; balance smooth.
4,5. Good; fluid; smooth; no coagulation or flocculation.

The coagulation points of the foregoing compositions containing 5% additions of 15:1 polymethoxy acetals were 29 to 48° C. lower than for similar control compositions listed in Table 1 and that this effect was obtained solely by the addition of the 15:1 polymethoxy acetals.

The thickness and appearance of coagulates obtained by dipping a hot form into the latices heat-sensitized with 15:1 polymethoxy acetals was determined in the same manner as given in Example IV. The results obtained were as follows:

Appearance of coagulates:
1. Latex coagulated on shaking the bottle at room temperature (30° C.).
2. Excellent, thick, smooth coagulate about 1/8 to 1/4 inch thick; not runny; coagulate true to form.
3. Good, smooth coagulate about 1/8 inch or more thick; not runny or drippy.
4. Good, smooth coagulate about 1/8 inch thick; not runny.
5. Good, smooth coagulate about 1/8 inch thick; not runny.

From the above results it is to be noted that the coagulates were in every instance much thicker, smoother, and more satisfactory even though the form was heated to a much lower temperature before being dipped into the heat-sensitized latex than coagulates obtained from similar control compositions listed in Table 1.

The condensation product of one mole of propionaldehyde dimethyl acetal (1,1-dimethoxypropane) and 14 moles of methyl vinyl ether (R=methyl and $n=15$ in formula on page 2) prepared by the procedure of U. S. P. 2,487,525, heat sensitized natural rubber latex similar to the 15:1 methoxy acetals of Table 4.

We claim:
1. A natural rubber latex composition, adaptable for the manufacture of rubber articles by coagulation at a temperature between 35-130° C., containing in a heat-sensitizing amount at least one polymethoxy acetal having the following general formula:

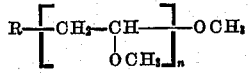

wherein $n$ represents an integer of 5 to 40, and mixtures thereof, and R represents a member of the class consisting of hydrogen and lower alkyl.

2. A natural rubber latex composition according to claim 1 wherein the polymethoxy acetal has the following formula:

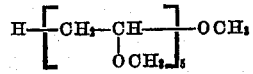

3. A natural rubber latex composition according to claim 1 wherein a polymethoxy acetal has the following formula:

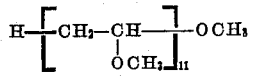

4. A natural rubber latex composition according to claim 1 wherein a polymethoxy acetal has the following formula:

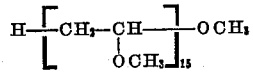

5. A natural rubber latex composition according to claim 1 wherein a polymethoxy acetal has the following formula:

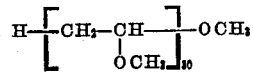

References Cited in the file of this patent
UNITED STATES PATENTS

| | | |
|---|---|---|
| 1,635,576 | Hadfield | July 12, 1927 |
| 1,750,540 | Pestalozza | Mar. 11, 1930 |

UNITED STATES PATENT OFFICE

CERTIFICATE OF CORRECTION

Patent No. 2,842,606                                           July 8, 1958

George G. Stoner et al.

It is hereby certified that error appears in the printed specification of the above numbered patent requiring correction and that the said Letters Patent should read as corrected below.

Column 7, line 65, for "1/6-inch" read -- 1/8-inch --.

Signed and sealed this 2nd day of December 1958.

(SEAL)
Attest:

KARL H. AXLINE
Attesting Officer

ROBERT C. WATSON
Commissioner of Patents